US005235996A

United States Patent [19]

Beswick

[11] Patent Number: 5,235,996

[45] Date of Patent: Aug. 17, 1993

[54] BOTTLE WASHER WITH MULTIPLE CARRIER

[75] Inventor: Frank Beswick, Phoenixville, Pa.

[73] Assignee: The West Company, Incorporated, Phoenixville, Pa.

[21] Appl. No.: 798,500

[22] Filed: Nov. 26, 1991

Related U.S. Application Data

[63] Continuation of Ser. No. 518,757, May 2, 1990, Pat. No. 5,135,014.

[51] Int. Cl.[5] .......................... B08B 9/08; B65G 47/12

[52] U.S. Cl. .................................... 134/125; 134/126; 198/446

[58] Field of Search ................ 198/445, 446; 134/125, 134/126

[56] References Cited

U.S. PATENT DOCUMENTS

| | | | |
|---|---|---|---|
| 2,687,203 | 8/1954 | Ladewig | 198/446 |
| 2,861,670 | 11/1958 | Read et al. | 198/445 X |
| 2,935,173 | 5/1960 | Cozzoli | 198/445 |
| 3,710,918 | 1/1973 | Babunovic | 198/445 |
| 3,907,096 | 9/1975 | Cioni et al. | 198/446 |
| 4,060,166 | 11/1977 | Hartness et al. | 198/446 |

FOREIGN PATENT DOCUMENTS

| | | | |
|---|---|---|---|
| 1004103 | 3/1957 | Fed. Rep. of Germany | 198/445 |
| 0139909 | 8/1983 | Japan | 198/446 |

*Primary Examiner*—Philip R. Coe

*Attorney, Agent, or Firm*—Eugene E. Renz, Jr.

[57] ABSTRACT

Apparatus for washing bottles, in which a transfer conveyor define an endless loop belt between an inlet end and outlet end. A plurality of cups are carried along the endless loop. An inlet elevator adjacent the inlet end supplies a quantity of bottles in an open end down orientation to the cups. Fluid injectors are movably mounted on the conveyor to position a nozzle into each open end down oriented bottle to supply fluid to inside of the bottles. An outlet elevator is adjacent outlet end for removing bottles from the apparatus in an open end up orientation.

8 Claims, 11 Drawing Sheets

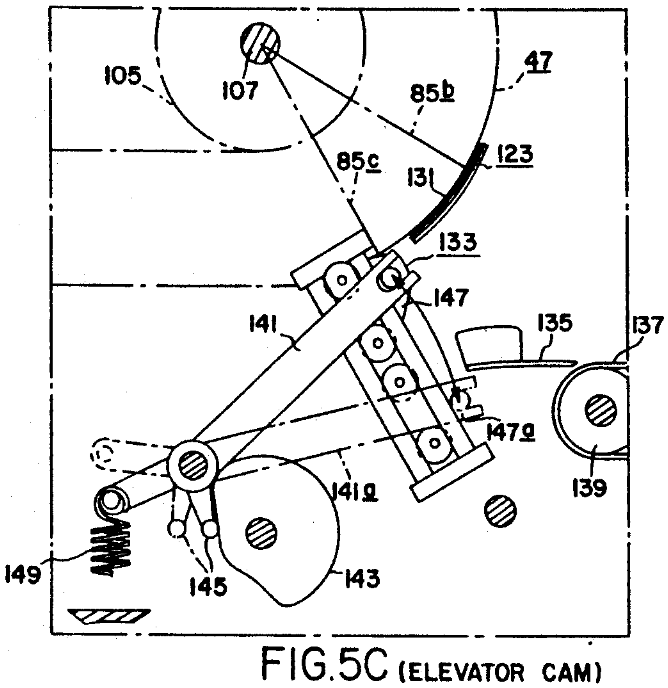
FIG.5C (ELEVATOR CAM)
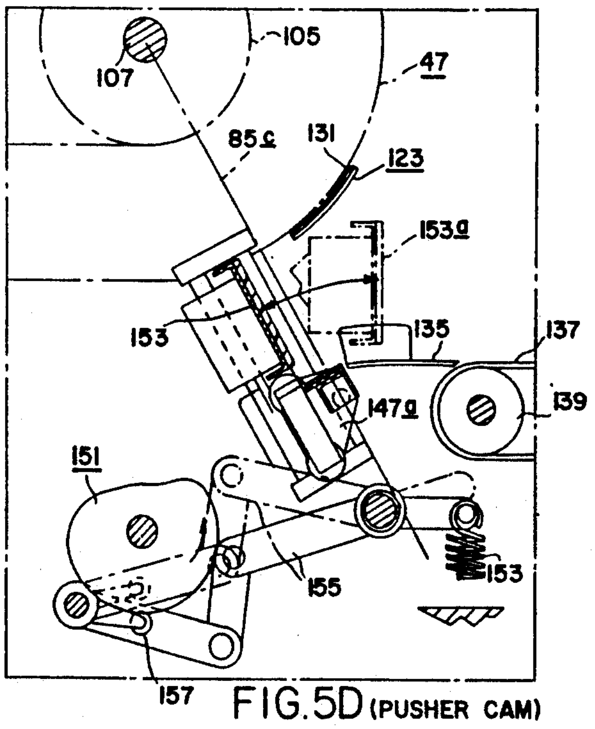
FIG.5D (PUSHER CAM)

BOTTLE WASHER WITH MULTIPLE CARRIER

This is a continuation of copending application Ser. No. 07/518,757 filed on May 2, 1990, and now U.S. Pat. No. 5,135,014.

FIELD OF THE INVENTION

The present invention relates to an improved bottle washer with multiple size bottle carriers for handling and transporting a variety of sizes of bottles for cleaning and spraying.

BACKGROUND OF THE INVENTION

One fundamental step in the packaging of pharmaceutical industry products as well as in many other industries is the step of washing the containers. Vials, bottles, jars and other containers, whether made from glass or plastic or other materials, are often contaminated during the manufacturing process. Sometimes storage conditions are less than totally clean, due to the need of maintaining large inventories of bottles, vials, and the like, so the danger of contamination exists. Even when sterilization is employed with these containers, the presence of sterile dirt or other undesirable solid particles would be unacceptable and additional cleaning would be necessary.

Health regulations may require that containers be cleaned, preferably by washing with hot water, for example, followed by an air rinse even if the container is later to be sterilized. Sometimes, sterilization does not take place until after the product has been placed in the container. For that reason, there is a need to provide apparatus for washing bottles and the like with a high degree of efficiency.

It is clearly not practical to wash every container by hand and, therefore, it has been necessary to propose various machines for washing bottles and the like. One major difficulty which all of the prior art machines possess is that there is a significant amount of breakage when these containers are handled by various elements of the machine. Breakage occurs during the introduction of the bottle to the apparatus as well as when the bottle is withdrawn from the washing apparatus. Moreover, the force of washing with fluids such as hot water is also a source of breakage. Particularly when large numbers of glass bottles are to be washed, there is particular concern that the bottles will bump one another or bump hard metal parts, thereby causing breakage of the bottles. It is therefore an object of the present invention to provide an apparatus for washing bottle which minimizes breakage.

In some instances, the finish of a bottle provides a very narrow opening, thereby limiting access to the interior of the bottle. Nevertheless, the interior is the area which is most important to clean. Other bottles have relatively sharp divergence between the neck and the rest of the bottle, making it difficult for water under pressure to enter the bottle and contact the entire interior surface of the bottle.

Methods for inserting a nozzle into the interior of a bottle have not met with success for several reasons. Primarily, insertion of a washing nozzle into the interior of the bottle requires accurate positioning of the bottle with respect to the nozzle and this has been unattainable in high volume washing equipment until now. Even when the position of the bottle and the nozzle are accurately located, the timing of the insertion has been difficult to synchronize, thereby negating the accuracy of the placement. It is therefore another object of the present invention to provide an apparatus for washing bottles which functions precisely while operating at relatively high speeds.

Most machines for washing bottles and the like function like greatly enlarged dishwashers, in that bottles are placed in the unit, washed and removed. This "batch process" method is inefficient in modern production lines, where most or all of the other operating stations are continuous rather than batch process. Yet another object of this invention is to provide a continuous process for washing bottles.

SUMMARY OF THE INVENTION

It has now been discovered that the above and other objects of the invention may be accomplished in the following manner. Specifically, an apparatus for washing has been discovered which accomplishes the objects of this invention for a variety of bottles.

For the purposes of this invention, the term bottle is used to describe the object which is being washed by the apparatus of this invention. The term "bottle" is intended to include bottles, vials, jars, and any other container which has an opened end and which can be carried by the apparatus of this invention without major modification to the apparatus. As will be noted herein below, the size of the bottle does not limit the application of the principles of the present invention. Rather, by appropriate and relatively minor modification, a wide variety of bottle sized can be used in combination with the present invention.

The apparatus of the present invention includes a transfer conveyor means defining an endless looped path between an inlet end and an outlet end. The endless looped path comprises a chain and sprocket means to which are fastened various transverse members as described herein below. The endless looped path includes a plurality of cup means carried along the endless loop and operates on an intermittent or step by step action. Adjacent the inlet end is an inlet means for supplying a quantity of bottles to the cup means in an open end down orientation. At the outlet end of the endless loop, an outlet means is provided adjacent thereto for removing bottles from the apparatus in an open end up orientation. In between the inlet and the outlet, a fluid injector means is provided which is movably mounted on the frame and is adapted to position a nozzle in the open end down oriented bottles. The injector means includes fluid supply means for washing the inside of said bottles as the bottle reach and stop at washing, rinsing and drying stations along the path.

The bottle cup means preferably includes a plurality of cups which are positioned on transverse members and carried by the transfer conveyor means. The cup means include an open end for receiving the bottles in an open end down orientation and have tapered interior ribs to permit the accommodation of a range of bottle sizes. The cups further include a second open end through which a fluid injector nozzle may be inserted, so that the injector can reach the interior of the open end down oriented bottles held in the cup.

In addition, each cup includes a slot means defining a slot aligned along the path for cooperation with other cups and a movable hold down means which can be lowered into the first open end of the cup to restrain movement of bottles during the washing process. By appropriate alignment of the adjustable hold down means and the path of the transfer conveyor means, bottles can be placed in an open end down orientation in the cup as the cup passes the inlet. Thus by the time the cup is fully vertical in orientation, the bottle has been inserted and the hold down means is aligned to cooperate with the slots.

In one preferred embodiment, the transfer conveyor endless looped path moves the cup means to a bottle receiving orientation from a bottle discharging orientation at the inlet end and reverses this orientation at the outlet end. Thus, the orientation of the cup means passes through a horizontal orientation at each end and achieves a vertical orientation carrying the cups from the inlet to the outlet. The cups obviously have a vertical orientation on the return portion of the path as well.

In a preferred embodiment, the cups include a second open end at what would be the bottom of the cup during the time when the bottle is positioned in the cup. Of course, the open end is not large enough to allow the bottle to fall through the bottom of the cup. Injector nozzles are movably positioned so that the injector nozzle itself can be raised up through the second open end of the cup and, preferably, extend into the interior of the bottle held in the cup. Fluid can then be expelled from the end of the nozzle, contacting the entire interior of the bottle. This system is adapted to deliver fluids such as water, with or without detergents, air or other gases for drying the interior, and even coatings for the interior of the bottle.

BRIEF DESCRIPTION OF THE DRAWINGS

These and other objects of the present invention and the various features and details of the operation and construction thereof are hereinafter more fully set forth with reference to the accompanying drawings, where:

FIG. 5C is a fragmentary schematic elevational view showing details of an elevator cam assembly.

FIG. 5D is a fragmentary schematic elevational view showing the details of a bottle pusher cam assembly and motion.

DETAILED DESCRIPTION OF THE PREFERRED EMBODIMENT

Described in detail herein is an improved bottle washer with multiple size bottle carriers for handling and transporting the various sizes of bottles which need cleaning and/or spraying prior to further use. The device has adjustable features for handling a large conventional range of multi-sized bottles, such as those used in the pharmaceutical industry. The device may be quickly customized to handle various production runs of large and small medicant bottles.

Figure 1:
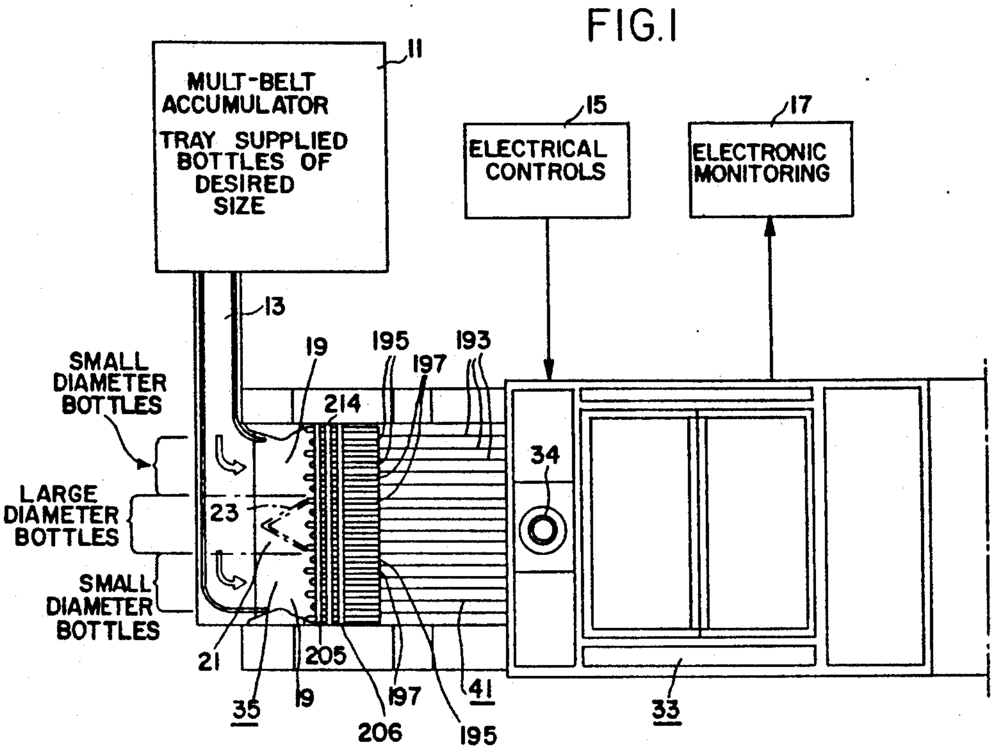
FIG. 1 is a semi-schematic plan view of a multi purpose bottle washing assembly according to the principles of the present invention.
Figure 2:
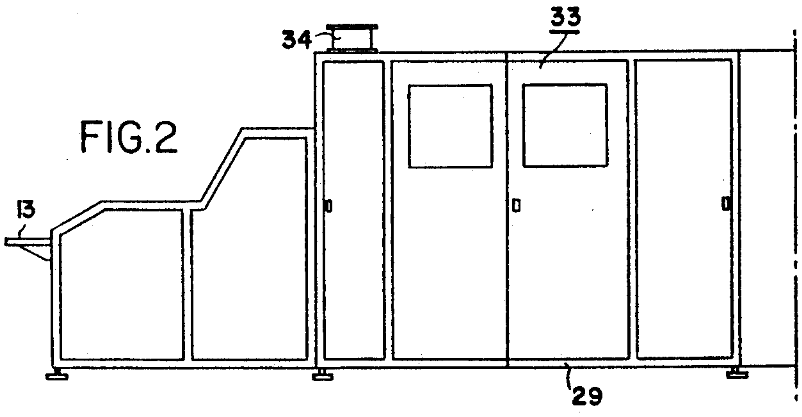
FIG. 2 is a semi-schematic side elevational view of the assembly shown in FIG. 1.

In the schematic plan view show in FIG. 1, a multibelt accumulator 11 is fed with bottles of desired size from a source, not shown, so that the bottles can be placed on conveyor 13. Conveyor 13 transports bottles in an open side up orientation to the device of this invention. Electronic controls necessary for operating the unit are contained in control box 15. Electronic monitoring information is provided in monitor 17, so that the conditions of operation are shown in real time. It is desirable to feed bottles of only one size at a time to accumulator 11, at least with respect to generic large and small sizes.

As the bottle enter the system, they are transferred to either the small bottle conveyor 19 or to the large bottle conveyor 21, depending upon the particular bottles on conveyor 13. Divider 23 is positioned in this instance to direct the small bottles to the appropriate conveyors 19. In FIG. 1, divider 23 is closing off the large diameter bottle lanes and conveyor 21 from the accumulator 11.

Figure 3:
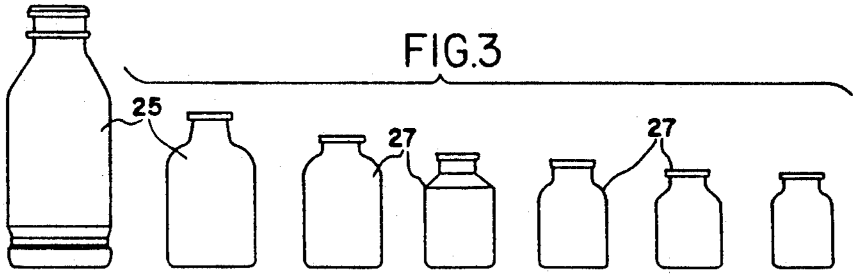
FIG. 3 is an illustration of conventional medicant bottle diameters and proportions.

As shown in FIG. 3, two sizes of large bottles 25 are shown along with five different sizes of small bottles 27. As will become apparent herein below, a variety of sizes of large bottles 25 or small bottles 27 can be accommodated, as long as the differences between the individual bottles in either category is not large. It is intended that the apparatus of the present invention will be used to wash and/or spray large volumes of bottles for a variety of purposes, so that different products can be manufactured in the same facility. For example, a large volume of one bottle for aspirin may be followed by a large volume of bottles for cold tablets or some other product. Even though the two bottles may be slightly different in size, they both would fit within one of the two general categories of large bottles 25 or small bottles 27, whereby the apparatus of this invention can accommodate a complete range of products for one manufacturer.

The apparatus itself is mounted on frame 29 and includes an inlet conveyor 35 and elevating conveyor 41 in enclosed chamber 33, which is provided to contain the spray which naturally occurs during the washing and/or coating processes. Exhaust vent 34 may be provided if desired. Alternatively, exhaust vent 34 may be replaced by an air intake fan.

Figure 4:
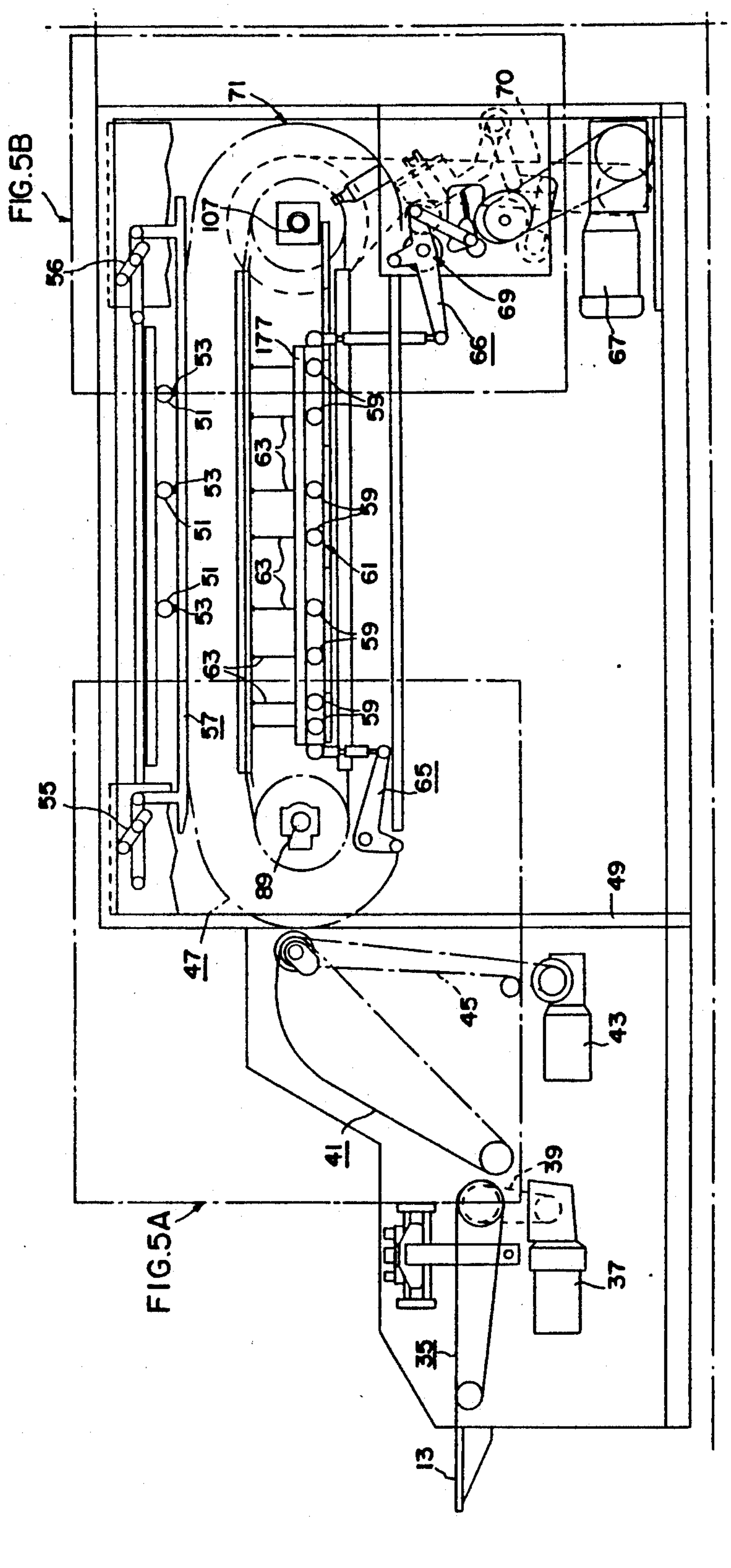
FIG. 4 is a schematic side elevational view of a bottle processing assembly according to the present invention, illustrating various stations and assemblies.

As shown in FIG. 4, various stations and assemblies such as drives, conveyors, hold down mechanisms and washing fluid manifolds are shown. Bottles from conveyor 13 are transferred to an input conveyor 35 which is wide enough to accommodate a plurality of rows of bottles, as will be described hereinafter.

Conveyor 35 is driven by motor 37 and chain drive 39 to deposit bottles in an open side up orientation on spacing and lifting conveyor 41. This spacing and lifting conveyor 41 is driven by motor 43 and chain drive 45 to lift the bottles in a spaced, predetermined distance and to begin to invert the bottles as they approach endless loop conveyor 47.

Endless loop conveyor 47 is carried on support frame 49, and intermittently driven by motor 67 and chain drive 70 which in turn is mounted on frame 29. As will be described herein below, bottles are carried on the endless loop conveyor 47 in an open side down orientation. Loop 47 indexes the bottles along the path from one station to the next.

Upper manifolds 51 supply washing fluid to upper transverse washers 53 to wash the bottom and outside of the bottles carried on conveyor 47. Hold down support adjuster mechanism 55 and 56 lowers hold down bar 57 to a position proximate the bottles to prevent them from being forced out of the carriers on endless loop conveyor 47.

Positioned below the top run of endless loop conveyor 47 are lower manifolds 59 for providing fluid to lower transverse washers 61. These lower transverse washers 61 feed a plurality of injector nozzles 63 which are moved using the adjustment mechanism 65 and 66 to insert the injector nozzle 63 into the interior of the bottles being carried on the conveyor loop 47.

As the loop 47 indexes the bottles on the path, adjustment mechanism 65 and 66 raise and lower the injector nozzles 63 into the bottles. A relatively large motor 67 operates cam operated and timed injector manifold lift mechanism 69 as will be more extensively described herein below.

Once the bottles have been subjected to fluid washing or spraying from both the upper washers and injector nozzles 63, they are delivered to discharge end 71 of conveyor 47 for further processing as will be described herein.

Figures 5A, 6, 7:
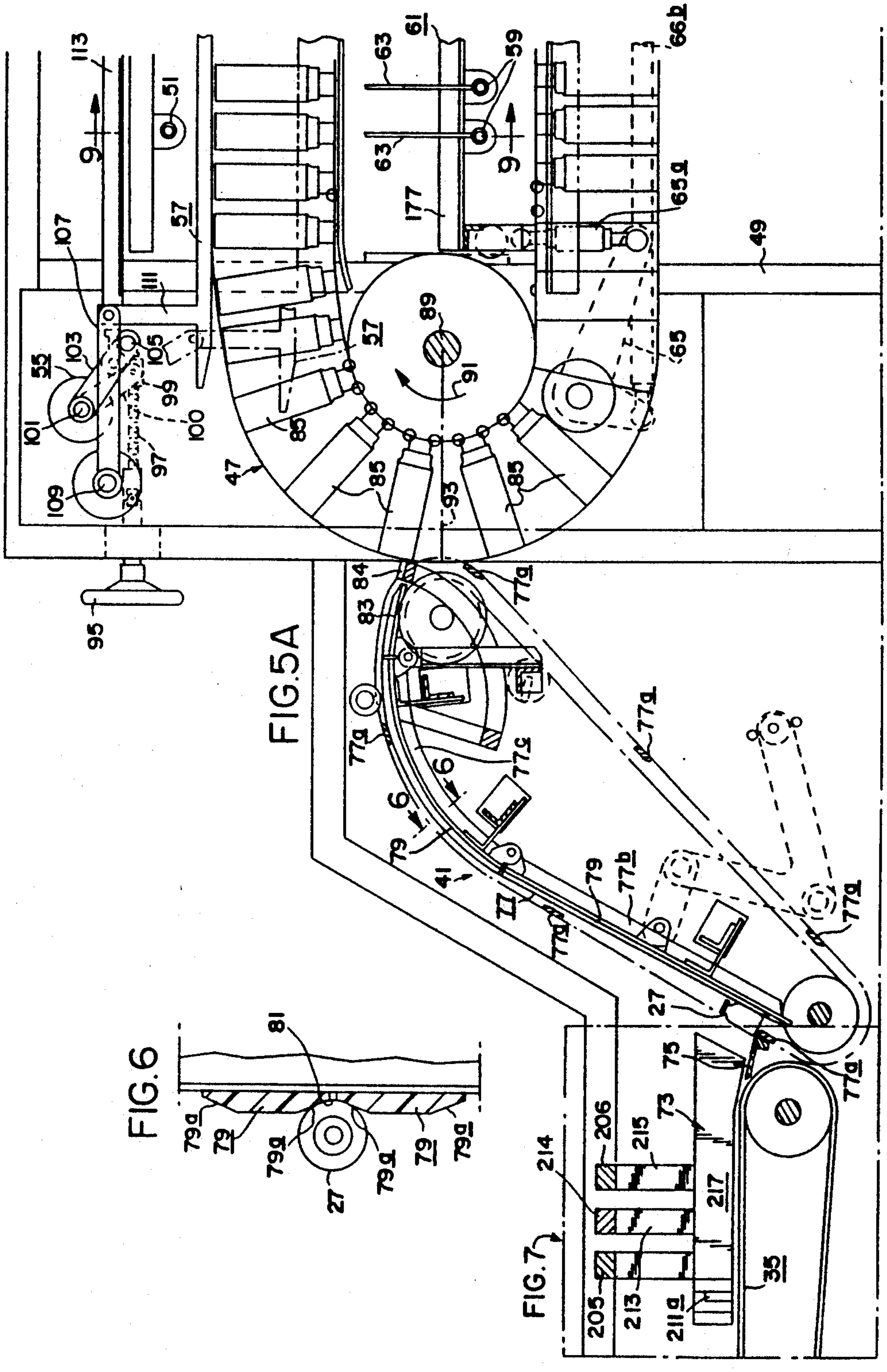
FIG. 5A is an enlarged fragmentary sectional elevational view of that portion of the assembly enclosed by the dot and dash box shown in FIG. 4 and designated FIG. 5A.
FIG. 6 is an enlarged fragmentary sectional view taken along the line 6—6 of FIG. 5A.
FIG. 7 is an enlarged fragmentary section elevational view of the detail area enclosed with the dot and dash box shown in FIG. 5A and designated FIG. 7.

A more detailed operation of the inlet side of the apparatus of the present invention is shown in FIG. 5A. Bottles are carried by conveyor 35 through lane divider plates 73 which separate the individual bottles into parallel rows. The bottles are fed from conveyor 35 onto dead plate 75 which is inclined so that bottles will be moved by bottles following along on conveyor 35.

The bottles 27, for example, are then nudged into engagement with spacing and lift conveyor 77. The spacing and lifting conveyor 77 includes a plurality of equally spaced bottle lifts **77*a* which lift the bottles in a spaced and open end up orientation as they travel along the locus of conveyor surface 79**.

As shown in FIG. 6, spacing and lifting conveyor 77 comprises a bed of low friction, synthetic adjustable slats 79 having tapered side edges **79*a*, such that two adjacent slats form a trough 81 which center and aligns bottles 27 as they are lifted by spacing bars 77*a*. There will be a number of troughs 81 extending transversely and corresponding to each row of bottles 27 or 25 on conveyor 35**.

Conveyor 77 comprises an adjustable lower and linear portion **77*b* and an upper adjustable and tangentially adjoining arcuate portion 77*c* providing a short downwardly directed slide portion 83. Tangentially aligned and adjacent the outer terminal end of slide 83 is positioned a pivotally mounted cam actuated bridging member 84 to accommodate the path of the lifting bars 77*a*** and provide a continuous path for bottles, particularly the smallest bottles.

The bottles slide on bottle slide surfaces 83 into cup means 85, which are being indexed about shaft 89 in the direction shown by arrow 91. As each cup means 85 passes the horizontal line 93 to the next indexed stop, gravity allows bottle 27 to slide on face 83 and enter gently into individual cup means 85. As that cup 85 continues to be indexed in the direction of arrow 91, cup 85 is vertical as it enters into the washing and spraying phase of this apparatus.

As will be appreciated hereinafter, the bottles which are contained in cup means 85 are subjected to spray of fluids from both the top and the bottom. Spray from the top, such as from upper transverse washer 53, will reinforce the effects of gravity, holding the bottles in cup means 85. However, when spray comes from injector nozzles 63, particularly when they have been placed inside the bottle 27, it is necessary to hold down the bottles 27 in cup 85 to prevent breakage or damage to the equipment.

Bottles are held in place in the open end down orientation in cup means 85 by means of hold down bar 57. Manual adjustment wheel 95 is universally connected to jack screw 97, which threadedly engages nut 99 mounted on the lower terminal end of lever 100. Lever 100 is keyed to shaft 101 as is lever 103. The lower terminal end of lever 103 retains a transversely extending shaft 105. Shaft 105 supports lever 107 which is pivoted as at 109 to the frame and whose outer end pivotally connects to the vertically extending leg 111 of the hold down bar 57. A longitudinally extending tie bar 113 interconnects lever 103 to lever 115 at the egress end of the bottle washing chamber shown in FIG. 5B.

Lever 115 is identical to lever 103 and also retains a transversely extending shaft 117 on its outer terminal end. Shaft 117 which supports lever 119 is pivotally attached to the frame at 121, and has an outer terminal end pivotally connected to the other vertically extending leg 111 of hold down bar 57. Thus, any motion directed to one end of hold down bar 57 is exactly duplicated at the other end and hold down bar 57 is maintained parallel to cup travel throughout its length.

Figure 5B:
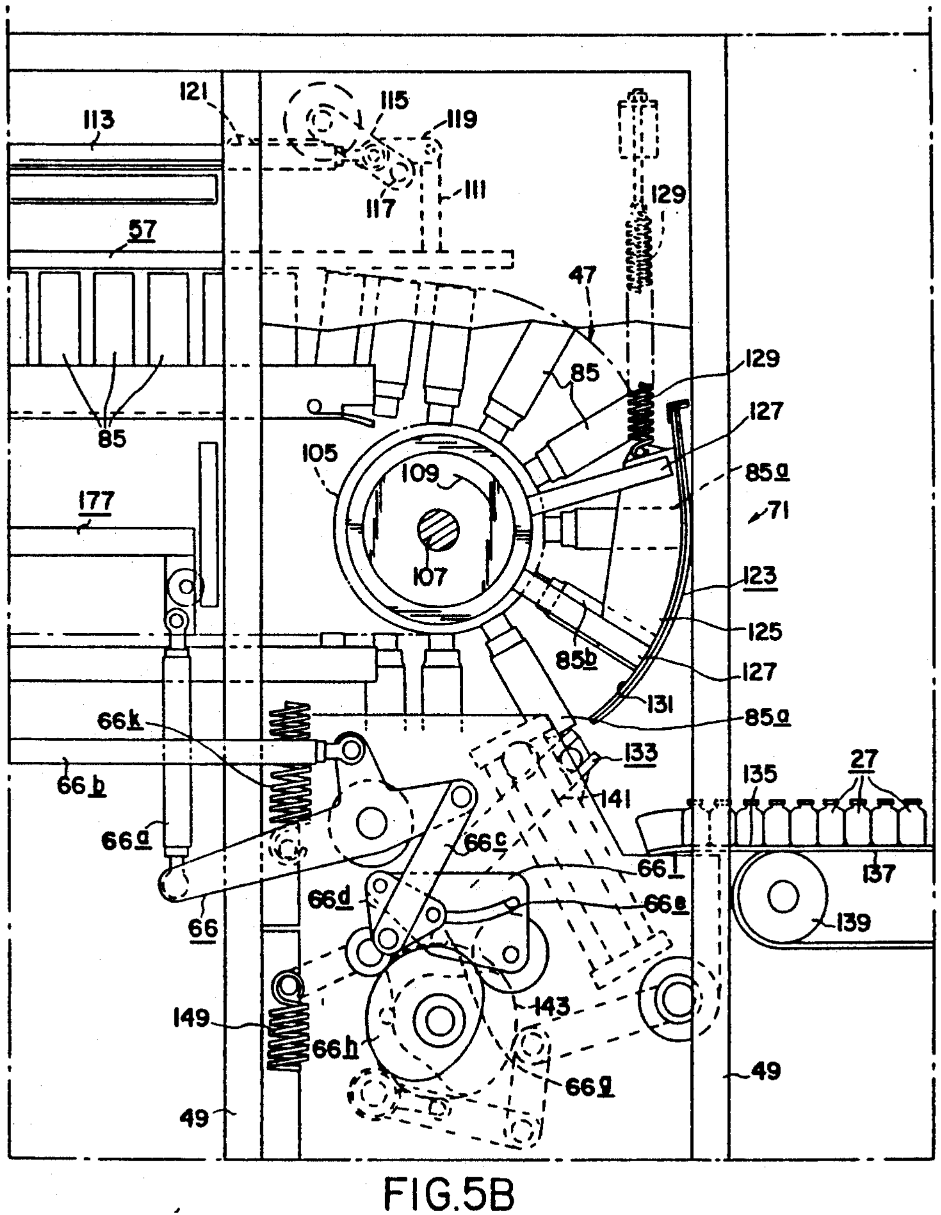
FIG. 5B is an enlarged fragmentary sectional elevational view of the portion of the assembly enclosed by the dot and dash box shown in FIG. 4 designated FIG. 5B.

As shown in FIG. 5B, the completely washed bottles are removed from cup means 85 as carried on endless loop conveyor 47. Endless conveyor 47 rotates about outlet sprocket 105 which is turning on shaft 107 in the direction of arrow 109. The bottles in cup means 85 are still in an open side down orientation as they rotate in the direction of arrow 109. As cup means **85*a* approaches the horizontal axis, the end of cup means 85***a* is in contact with a spring biased arcuate end wall 123 which itself is supported by side panels 125 attached to arms 127 and held by the spring 129. As cup 85*a* continues to rotate passed the horizontal, the bottom of the bottle contacts inside surface 131 of spring biased arcuate end wall 123 so that cup means 85*b* has effectively transferred the bottle to inside surface 131.

As the cup means continue to be indexed along on endless loop 47, the cup then reaches the position shown by cup 85*c*, which clears inside surface 131 of end wall 123 and deposits the bottle on elevator means 133. Elevator 133 then lowers the bottle to dead plate 135 by mechanism described hereinafter, and bottles 27 are passed across dead plate 121 onto exit conveyor 137. Conveyor 137 rotates about roll 139 to remove the bottles in an open end up orientation to a sterilizing chamber and then to packaging, filling, or other downstream operations.

The bottles are lowered by elevator 133 which is attached to arm 141 and is moved by the operation of cam 143 as described below.

As shown in FIG. 5C, the elevator cam 143 operates on a cam follower trunion 145 which is attached to arm 141. Bottles exiting from arcuate end wall 123 onto elevator means 133 are accepted by bottle holder 147. Operation of cam 143 moves the arm 141 to the lowered position 141*a* so that the bottles carried on bottle holder 147 are lowered to the position shown as 147*a*. Tension spring 149 assists in returning the arm 141 and bottle holder 147 to the upright position shown in solid lines during the time when cam 143 permits such movement.

In order to remove the bottles from the bottle holder 147, cam 151 also operates to move pusher plate 153 by raising arm 155 when that portion of cam 151 engages cam follower trunion 157. This causes the pusher plate 153 to be moved to the discharge position 153*a*, pushing bottles located on elevator 147*a* onto dead plate 135. As additional bottles are pushed onto dead plate 135, the lead bottle will then move onto conveyor belt 137. After the pusher plate 153 has moved to the position shown in 153*a*, tension spring 159 operates to return the pusher plate 153 to its original position so that elevator 133 can receive and lower the next bottle being processed by the apparatus.

Figure 9:
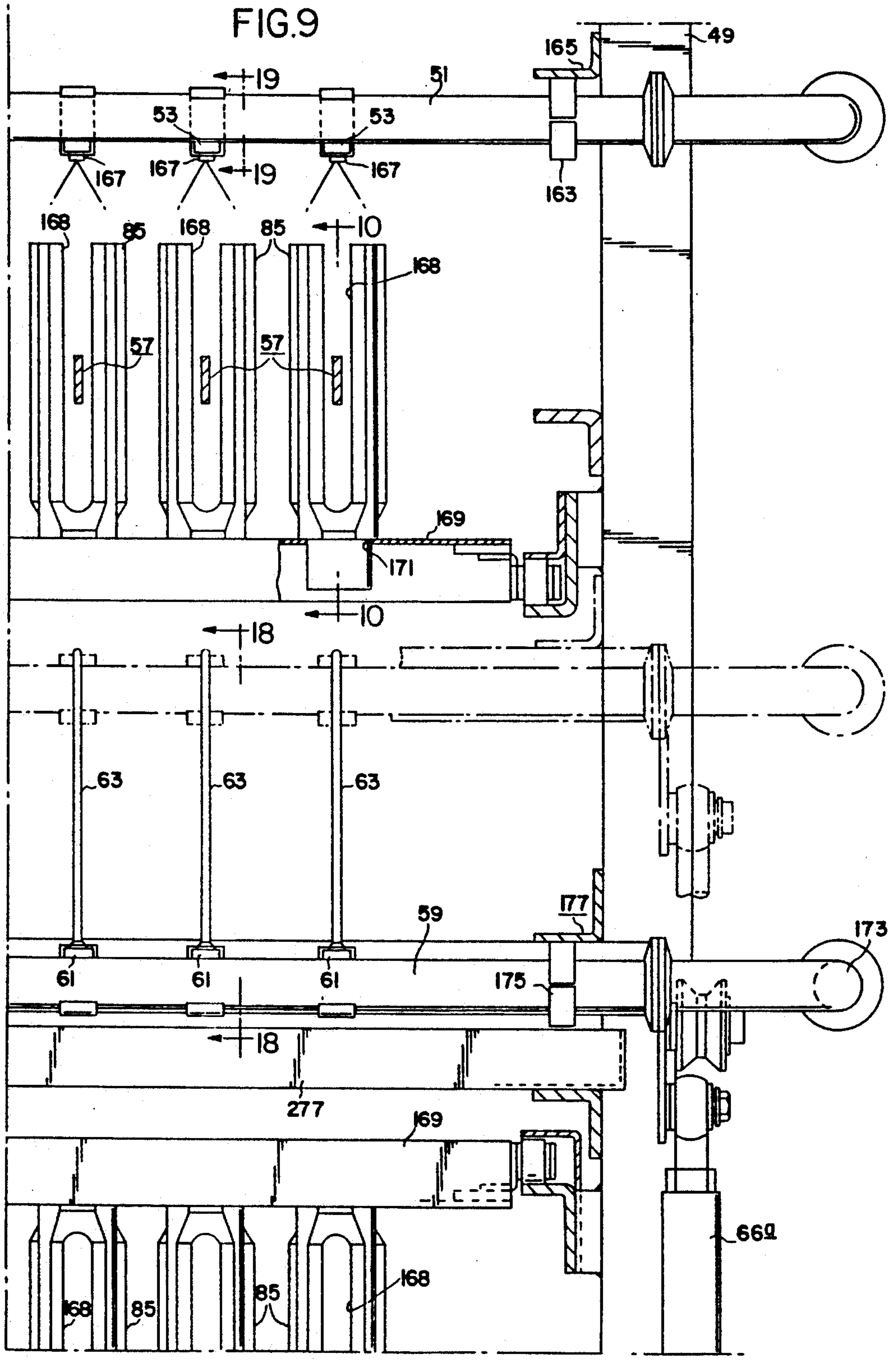
FIG. 9 is an enlarged fragmentary transverse sectional view taken along the line 9—9 of FIG. 5A.
Figure 11:
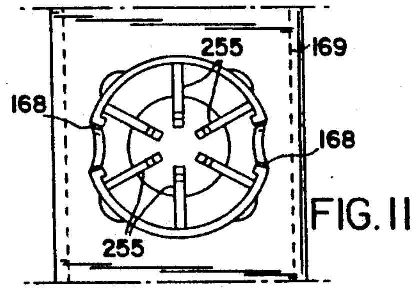
FIG. 11 is a plan view of FIG. 10.
Figure 10:
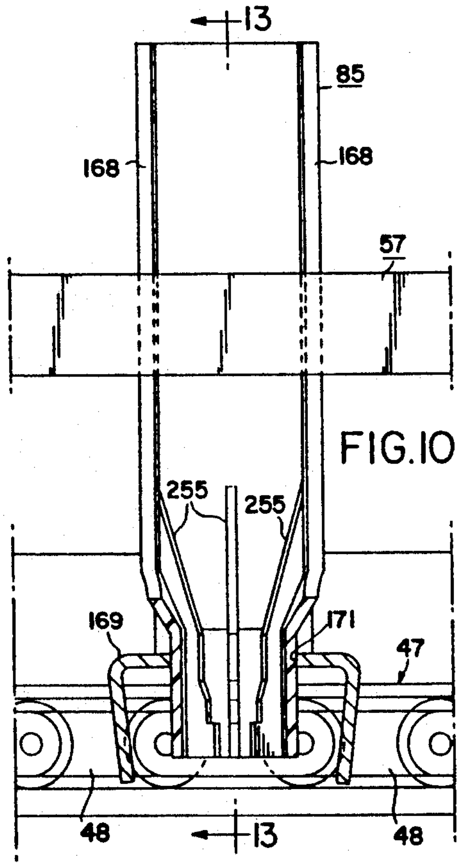
FIG. 10 is an enlarged sectional elevational view taken along the line 10—10 of FIG. 9.
Figure 13:
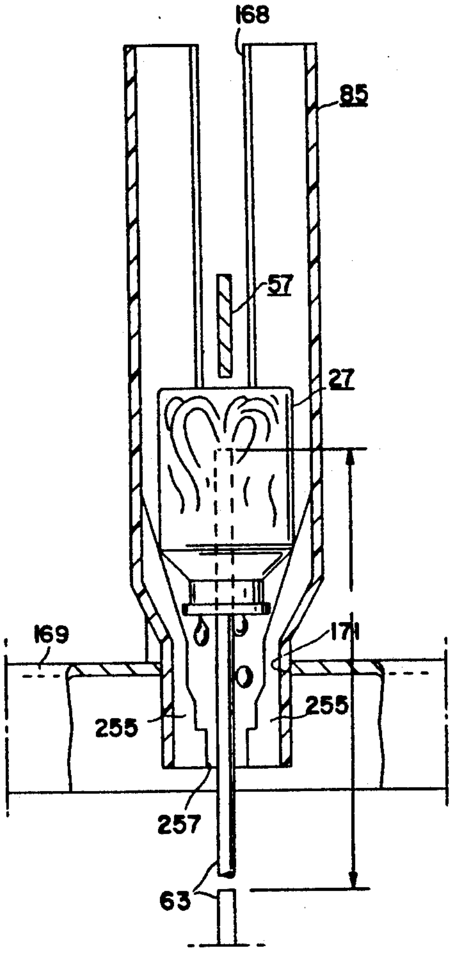
FIG. 13 is a sectional elevational view taken along the line 13—13 of FIG. 10.

The washing process is carried out in two phases, as is seen in FIG. 9. The bottles contained in cup means 85 are washed on the outside from spray nozzle 53 and are subjected to fluid from injector 63 on inside of the bottles.

The upper fixed manifold 51 are held in clamping brackets 163 which are spacedly attached to angle iron members 165, which in turn are mounted to the frame 49. Fluid contained in the manifolds 51 enters the transverse upper washers 53 and exits from spray nozzles 167. Spray can either be continuous or intermittent when the cups 85 are positioned for receiving the spray from the transverse washers 53.

As can be seen in FIG. 9, the cups 85 include longitudinal slots 168 which are aligned with the hold down bar 57 as the cup means 85 move in the direction of endless loop conveyor 47. The individual cup means 85 are held by transversely extending cup mounting bars 169 which have spaced mounting holes 171 for each cup. In this manner, many rows of bottles can be processed by the large number of cup means 85 held on the transverse cup mounting bars 169.

Lower reciprocating manifolds 59 have a plurality of lower washers 61 which support injector nozzles 63 as shown in FIG. 9. Lower manifolds 59 are supplied with fluid from the fluid supply means 173 and are supported by clamping bracket 175 on manifold mounting frame 177. When cup means 85 is aligned with injector nozzle 63, operation of the cam actuated lift mechanism raises the lower manifold mounting frame 177 to the position shown in dot and dash lines, thereby raising the washer 61 and injector nozzle 63 to a position wherein the injector nozzle 63 is inside cup means 85 and, in fact, inside the bottle contained in cup 85.

FIG. 7 shows a more detailed explanation of the inlet means where conveyor 35 introduces bottles 27 to the inlet of the apparatus. As the transverse mass of bottles 27 are advanced toward the spacing and elevating conveyor 77 by means of the inlet conveyor 35. The frontal mass of bottles 27 are divided into a plurality of discrete lanes 193 by means of a series of transversely staggered and spaced confronting lane divider members 195 and 197, which are spaced to allow flow of single file bottles 27 in lanes 193. Lanes 193 are aligned with troughs 81 of spacing and elevating conveyor 77 so that advancing bottles 27 are positioned in single file within each trough and are ready to be engaged by lifting bar 77*a*.

Though lane dividers 195 and 197 exhibit a staggered confronting surface to guide oncoming bottles 27 into a single file flow between the dividers, bottles tend to jam and interlock, blocking the flow of bottles in some lanes. To this end, lane dividers 195 are provided with a centrally located reciprocating blade 211. Reciprocating blades 211 break up the bottle jams, allowing free flow of the bottles into lanes 193. Dividers 195 and 197 are spaced alternately across conveyor 35. Dividers 197 are supported and fixedly positioned by means of a centrally and horizontally extending blade 201, having two vertically extending arms 203, whose upper terminal ends are bolted to two transversely extending support bars 205 and 206.

The horizontally extending blades 201 are capped with low friction synthetic cover member 209. Dividers 195 comprise a divided centrally and horizontally extending blade 211 having a reciprocating forward portion 211*a* and a fixed rearwardly extending portion 211*b*. The reciprocating forward blade 211*a* is supported by means of a vertically extending arm 213 whose upper terminal end is bolted to a reciprocating transversely extending beam 214. The fixed portion of the blade 211*b* has a vertically extending arm 215 whose upper terminal end is bolted to fixed transverse bar 206. The fixed blade 211*b* has secured to it a low friction synthetic member 217. As beam 214 is moved back and forth between fixed beams 205 and 206, the attached movable blades 211*a* of dividers 195 are also moved outwardly and inwardly. This tends to dislodge and unjam the oncoming bottles 27, allowing them to flow freely in single file into lanes 193. Beam 214 and attached blades 211*a* are reciprocated back and forth by the following means. Beam 214 is supported at both terminal ends on a carriage 219, which is in turn supported and is guided for linear motion by wheels 221 captured in guide brackets 223.

Carriage 219 is pivotally connected, as at 225, to lever 227. Lever 227 is pivotally attached to the frame as at 230. An arm 227*a* of lever 227 has attached to its outermost end cam follower 233. Cam follower 233 is held in conforming engagement with the profile of cam 235 by means of tension spring 237. Cam 235 is secured for rotation on the axle of conveyor 35 and its drive roll 239. Thus, the reciprocating blades 211*a* of the dividers 195 are continually in motion to urge oncoming bottles out of a jamming or interlocking mode.

Figure 18:
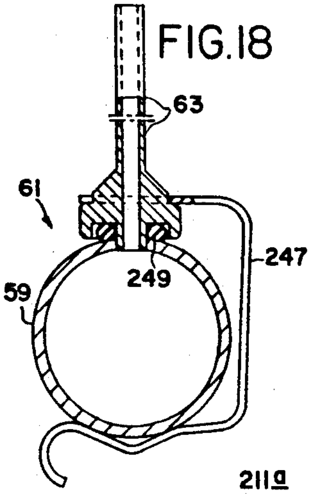
FIG. 18 is an enlarged sectional elevational view taken along the line 18—18 of FIG. 9.
Figure 19:
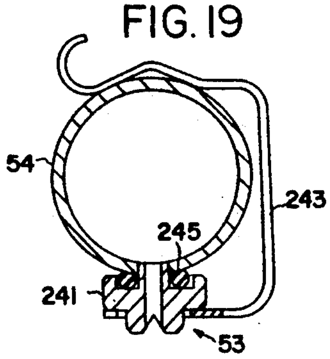
FIG. 19 is an enlarged sectional elevational view taken along the line 19—19 of FIG. 9.

As shown in FIG. 19, upper washers 53 containing nozzles 241 supported on manifold 54 by means of upper spring clip 243 and O-ring seal 245. Thus, fluid in manifold 54 passes through nozzle 241 and spring clip 243 maintains sufficient pressure on O-ring seal 245 so that all of the pressure of the fluid in manifold 54 is directed through nozzle 241. Similarly, as shown in FIG. 18, lower washing mounting 61 is held by spring clip 247 to manifold 59. Manifold 59 supplies fluid to injector nozzle 63 while spring clip 247 maintains O-ring seal 249 in a sealing relationship between manifold 59 and nozzle 63. If the movement of nozzle 63 is out of sequence with the indexing on path 47, spring clip 247 will permit washer mounting 61 to move axially around manifold 59 or even snap off to prevent damage to bottle means 85 or injector 63.

The specific design of the cup means 85 is shown in greater detail in FIGS. 10 through 13. Cup means 85 includes longitudinal slots 168 which allow hold down bar 57 to be maintained in cup means 85 during the travel along the top portion of endless loop 47. Endless loop 47 includes a plurality of chain links 48, to which are attached cup mounting bars 169. A plurality of ribs 255 are provided in cup 85 so that different bottle sizes will rest on ribs 255 at the appropriate location in cup means 85, thereby extending the versatility of each individual cup.

At the bottom of cup 85 is a relatively large hole 257 which allows injector 63 to be inserted when cup means 85 and injector 63 are appropriately aligned. Orifice 257 is also large enough to allow fluid to escape from cup 85 after it has contacted either the interior or the exterior of bottle 27.

Figure 12:
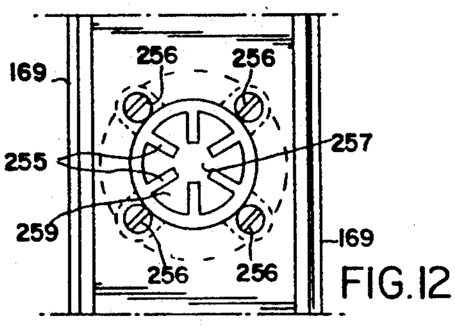
FIG. 12 is bottom plan view of FIG. 10.
Figure 15:
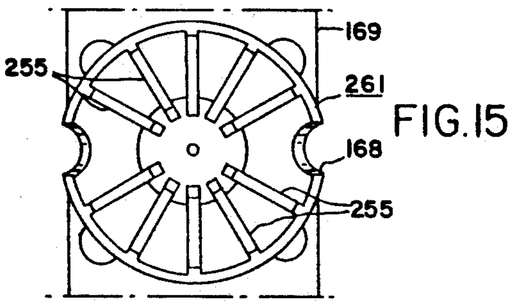
FIG. 15 is plan view of FIG. 14.
Figure 14:
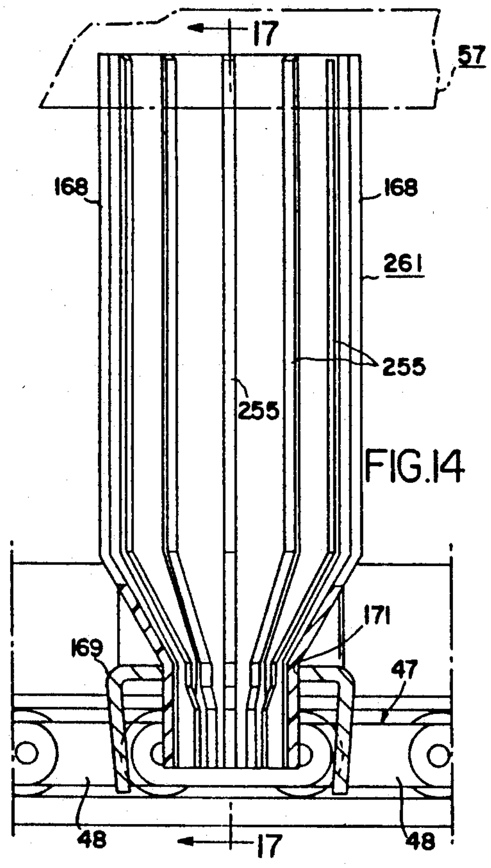
FIG. 14 is a sectional elevational view similar to FIG. 10, but showing the details of a different cup design.
Figure 16:
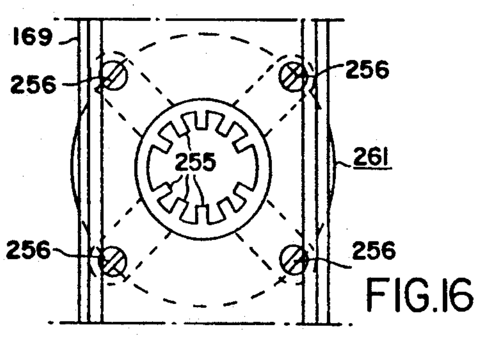
FIG. 16 is a bottom plan view of FIG. 14.
Figure 17:
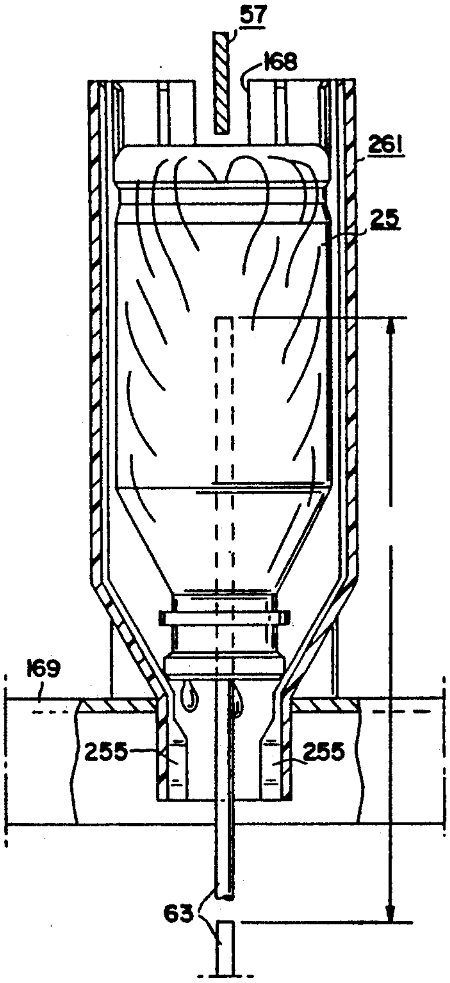
FIG. 17 is a sectional elevational view taken along the lines 17—17 of FIG. 14.

Each individual cup 85 is fastened to cup mounting bar 169 through a plurality of fastening screws 256, as is most clearly shown in FIG. 12. The relationship between the ribs 255 and the cups means shows the location of drainage orifice 259 and centrally located bottom orifice 257 for injector 63.

The same arrangement is provided for large cup means 261 which is functionally equivalent to the smaller cup 85 previously described. A larger bottle 25 can be processed in this arrangement, and with ribs 255, a variety of larger bottles 25 can also be processed using the same large cup means 261.

Figure 20:
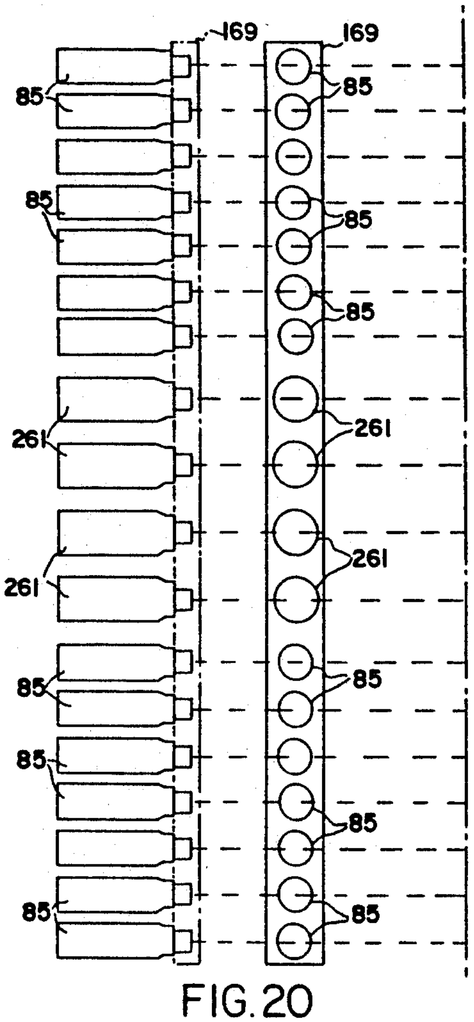
FIG. 20 is a schematic plan view showing the preferred embodiment of large and small cup placement along a transverse cup mounting bar.

FIG. 20 is a schematic plan view showing the preferred embodiment of small cup means 85 and large cup means 261 as they are placed along a transverse cup mounting bar 169. In this figure, four large cup means 261 occupy the four central lanes and six lanes of small cup means 85 are positioned on either side of the four central lanes. By blocking off the four central lanes, only the small bottles are run. This is usually the largest production run. When the small bottle run is completed, of course, the twelve small bottle lanes are blocked and the large bottle run commenced in the four middle lanes.

Figure 22:
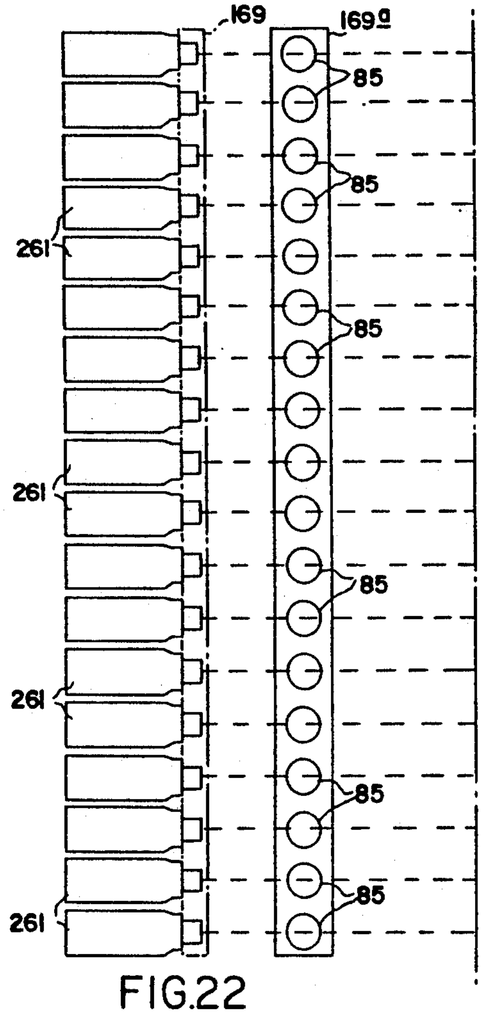
FIGS. 22 and FIG. 23 are schematic views similar to FIGS. 20 and 21 showing an alternative embodiment.
Figure 21:
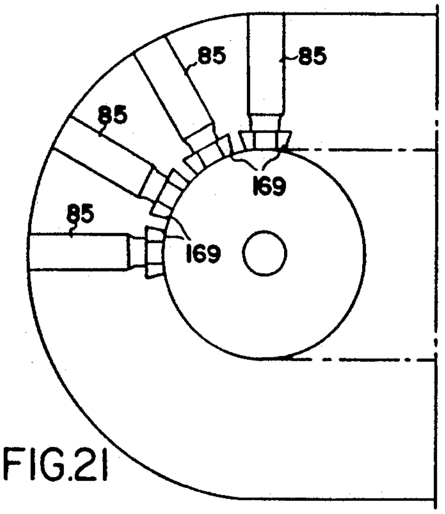
FIG. 21 is a schematic side elevational view of FIG. 20.
Figure 23:
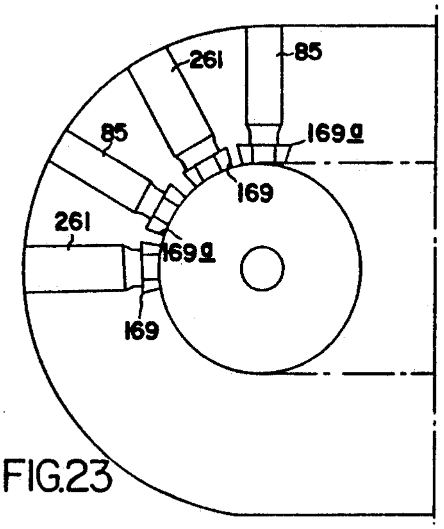

FIGS. 22 and 23 show in schematic view a similar alignment but having a modification such that alternate transverse cup mounting bars 169 and 169*a* include large cup means 261 on transverse mounting bar 169 and small cup means 85 on transverse mounting bars 169*a*.

Figure 24:
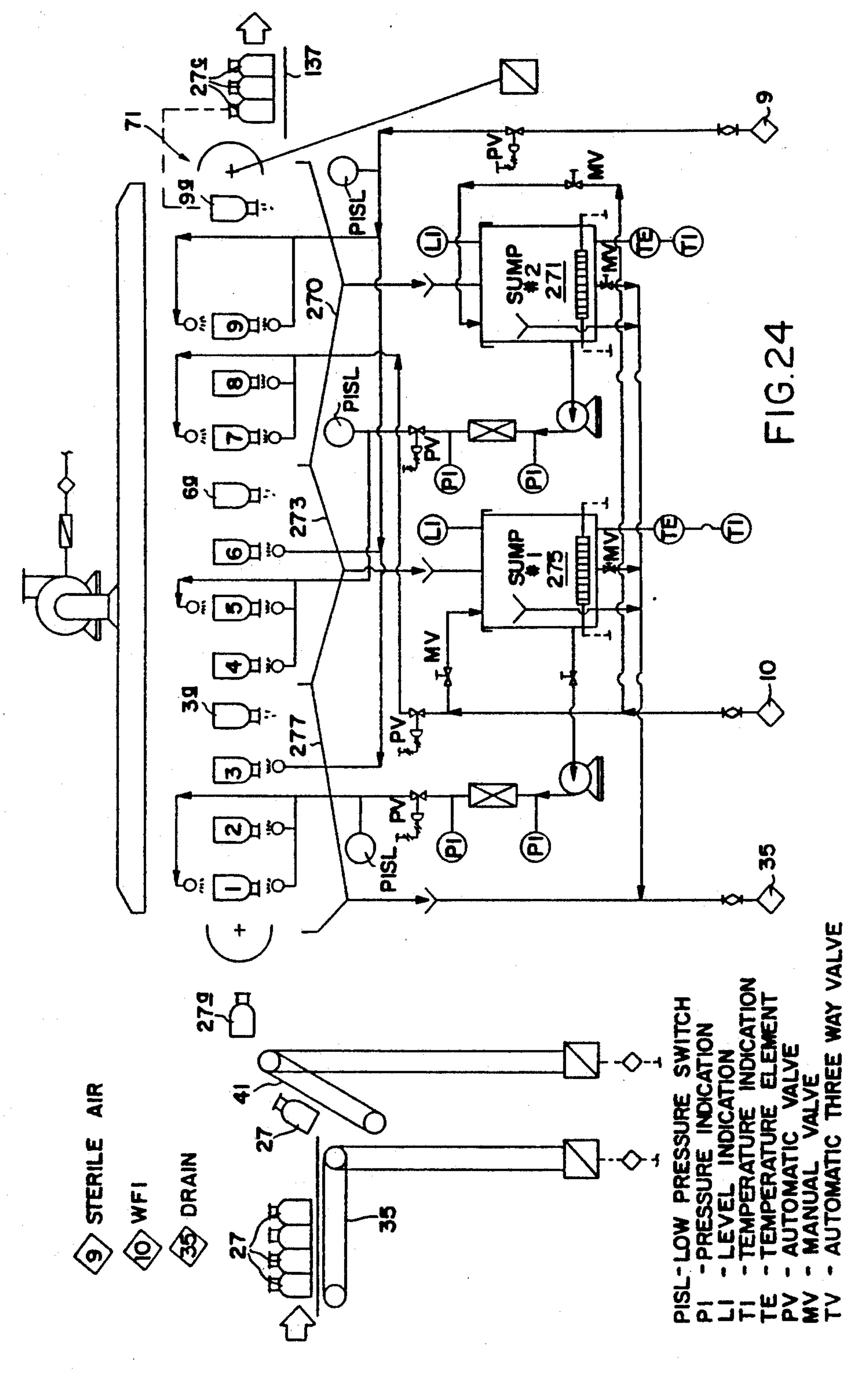
FIG. 24 is a schematic flow diagram illustrating the path of bottles through the bottle washing assembly.

As shown in FIG. 24, the operation of the system can be represented in a flow diagram illustrating the path of the bottles through the bottle washing assembly. It is to be understood that this is a schematic flow diagram showing the overall operation of the process utilizing the apparatus of this invention. The process shown in FIG. 24 involves the use of the apparatus of the present invention to wash and rinse and dry bottles by subjecting the bottles to a series of steps in the process.

Bottles 27 enter the system on conveyor 35 and are lifted by spacing and lifting conveyor 41. Bottle 27*a* is shown at the point where the open end orientation is aligned with the horizontal. As the bottle 27*a* is picked up by the cup means, not shown in this figure, the bottle achieves an orientation where the open end is facing down, shown by the numbered bottles 1, 2 and the like. The completely processed bottle is then withdrawn from the system at discharge end 71 and returned to outlet conveyor 137 now containing bottles 27*c* which have been returned to their original upright condition.

In the system shown in FIG. 24, it has been found to be effective to treat the bottles near the beginning of the process with fluids which have been used further downstream. In other words, as the bottles flow downstream, the washing fluids are used in a direction counter to downstream so that the cleanest solution contacts the cleanest bottle. Thus, bottle 9 is subjected to sterile air, after it has been washed completely and, once the final drops fall from bottle 9*a*, it is removed from the system as previously described. Prior to that, fresh water is supplied to the top of bottle 7 and also to the interior of bottle 7 through the lower fluid injector system.

When bottle 7 is then moved to the station where bottle 8 is located, an additional rinse of the interior of bottle 8 with fresh water is also accomplished. Fluid falling from bottles 7 and 8, and any that drains from bottles 9 or 9*a* falls into a first drain trough 270 which directs the fluid to second sump 271. Additional sterile water can be added to sump 271 by controlling the manual valve in response to the level shown by the level indicator. This water is, of course, the purest water since it has only contacted the cleanest bottles 7 and 8.

Water from sump 271 is then pumped to a second location so that bottle 4 can be washed from the interior and bottle 5 can have an interior and exterior wash. While some contaminants may be contained in the fluid from sump 271, this fluid is still substantially pure, depending, of course, on the efficiencies of the wash process in preceding stations 7 and 8.

The fluid which drains from bottles 4, 5, 6, and 6*a* enters second drainage trough 273 and is transferred to a first sump 275. Again, based upon an evaluation of the level, additional sterile water can be added to sump 275. The liquid in sump 275 now contains some sterile water as well as the water and residue or dislodged particles and dissolved impurities from two washing steps. Fluid from sump 275 is then pumped to wash the interior and exterior of the bottle as station number 1, as well as a second washing at station number 2. Fluid from this washing step as well as from the partially dried bottle at station 3 and 3*a falls* into a third trough 277 which lead to the drain or recovery system.

As is noted, there are certain pressure valves and manuals as well as sensors indicating pressure, liquid level, temperature, and the like. That information will be contained on the instrument panel or process monitor 17, while controls will be mounted on the control box 15 both first described with reference to FIG. 1.

Other control elements and monitoring elements can be provided as needed for use in the process and apparatus of this invention.

Figure 8:
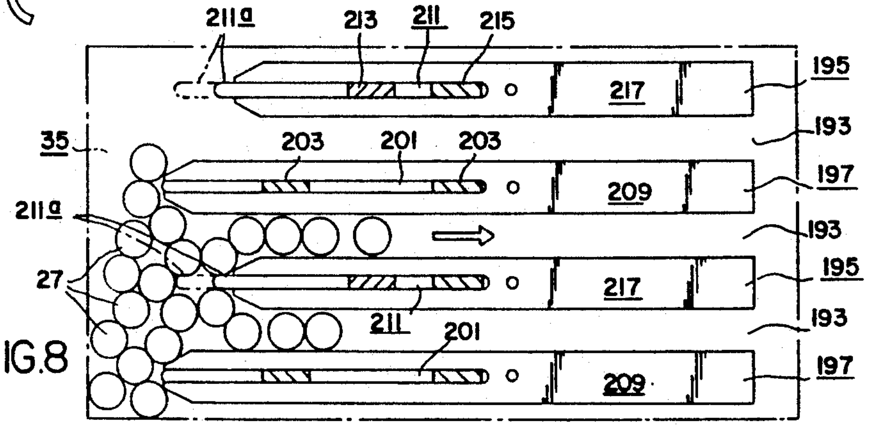
FIG. 8 is a fragmentary sectional plan view taken along the line 8—8 of FIG. 7.
Figure 7:
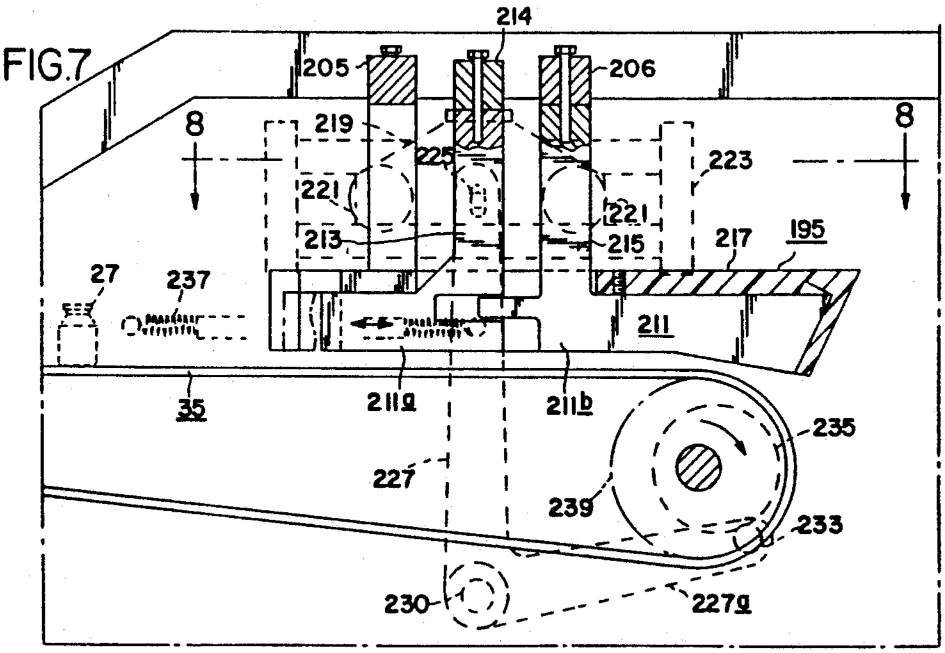

The operation of the apparatus of the present invention is as follows. The supply of desired size bottles are introduced from the multi-belt accumulator 11 onto conveyor 13 for entry into either small bottle 27 diameter conveyor 19 or large bottle 25 diameter conveyor 21. For purposes of example, small bottles 27 will be illustrated. This bottle enters the inlet to the system on conveyor 35. To avoid congestion and blockage when a large number of bottles are employed, the movable lane guides 195 shown in FIGS. 7 and 8 assist in funneling the bottles into the parallel rows or paths between lane dividers 195 and 197, for example.

As shown in FIG. 5A bottles reaching the end of conveyor 35 slide on dead plate 75 and are picked up by the bottle separator lift bar 77*a* carried by spacing and lifting conveyor 41. Bottles 27 then are lifted by separator lift bars 77*a* and are deposited onto bottle slide 83 which orients the bottle in an open end down orientation. Bottles then slide gently into cups 85 as the cups 85 passes from the horizontal axis 93 to a bottle receiving end up orientation.

As cup 85 reach an upright position, manual adjusting wheel 95 is turned to lower hold down bar 57 through slots 168 in cup 85. Conveyor 47 moves the cup means 85 intermittently along the endless path so that by the time cup 85 is vertical, it has been aligned with hold down bar 57. Bar 57 is adjustable as previously described, using manual adjustment wheel 95, so that bar 57 just clears the upward facing bottom of bottle 27 but does not place undue stress on the bottle.

At each stop on the path of the endless loop 47, injector nozzles 63 are axially aligned with a particular cup 85, having a bottle positioned therein. Injection nozzles 63 are raised so as to enter axially into the interior of the bottle 27 as it rests in cup 85. The height of the rise of the nozzles 63 is dependent on the size of bottle 27 and on the most efficient washing effect created by the distance from nozzle tips to the inside bottom of bottles 27.

The precise height distance which nozzles 63 travel must be pre-set for each bottle size that is run. To this end, lever 66 is pivotally mounted to the frame 49. Its inner extending arm is pivotally connected to vertically extending adjustable link member 66*a*. Upper terminal end of lever 66*a* is pivotally connected to the rearmost end of the nozzle manifold frame 177 and the bar 66*b* interconnects lever 66 to a bell crank 65 pivotally mounted on the frame 49. Bell crank 65 has pivotally secured to one arm vertically extending adjustable link 65*a* that is pivotally secured to the foremost end of the nozzle manifold frame, so that any motion imparted to lever 66 will be duplicated by bell crank 65 and the manifold frame will be raised or lowered in a perfectly horizontal planar condition.

The vertical displacement of the nozzle frame 177 can be finely adjusted by means of lever 66*c* pivotally connected to the rearmost end of lever 66. The downwardly directed terminal end of lever 66*c* is pivotally connected to an adjustable shoe 66*d* that is positionable within the limits of an arcuate slot 66*e* that is formed within a trapezoidal shaped lever 66*f*. Lever 66*f* is pivotally mounted to frame 49 at its outermost end and carries cam follower 66*g* that is kept in conforming interengagement with cam 66*h* by means of a tension spring 66*k* attached to lever 66.

Cam 66 is driven by motor 67. As shown in FIG. 5B, adjustable shoe 66*d* is moved to the extreme left hand position in slot 66*e*, causing the nozzle manifold frame 177 to rise to its greatest height. For very small bottles, the adjustable shoe 66*d* would be moved to the right. After the injector nozzles 63 finished spraying fluid, whether water or air, into the interior of bottles 27, they are lowered to their original position and the endless loop 47 indexes to the next position.

Eventually, the cup means 85 reaches the discharge end 71 of conveyor 47 and the bottles begin to rotate about shaft 107 and sprocket 105, changing the orientation from a vertically up direction to a vertically down direction, while, of course, passing through a horizontal position. As cup 85 approaches the horizontal, and the bottle contained in the cup means is no longer restrained by hold down mechanisms 57, the bottle begins to slide out of the cup means and gently impinges upon an arcuate, spring biased end wall 123. Bottles 27 are now riding on inside surface 131 of end wall 123. Inside surface 131 supports the closed end of the bottle until the bottle is transferred to the elevator 133. As endless conveyor loop 47 indexes and rotates the cup means 85 to the position shown by 85*c*, the bottle has gently been transferred to the elevator 133.

Once in each indexing step, cam 143 lowers the bottle holder on 147 on elevator 133 to lowered position 147*a* by cam pressure on cam engaging follower 145, which, of course, moves arm 141. As bottle holder 147*a* reaches its lower terminal position, cam 151 also causes pusher plate 153 to move to its discharge position at 153*a* by cam action on arms 155 and 157. Spring 159 returns pusher plate 153 to its normal position out of the way of elevator 147, so that spring 149 can return the bottle holder to its original position for receiving a bottle during the next indexing step.

Bottles are pushed onto discharge dead plate 135 and are eventually picked up by discharge conveyor 137, where the bottles are transferred to a sterilizing chamber, and then to packaging, filling, or other operations in the overall assembly process.

As can be seen from the foregoing description of the preferred embodiment, the apparatus and method of the present invention is capable of rapidly and efficiently cleaning a wide variety of bottles, producing effective products for use by the pharmaceutical industry and other industries.

Various modifications and changes to the foregoing description will become apparent upon a reading of the complete disclosure contained herein without departing from the spirit of the invention.

What is claimed is:

1. In apparatus for washing bottles having a washer housing and conveyor means for delivering bottles in random array from an inlet end through the washer housing, a plurality of dividers at the inlet end spaced apart relative to one another to define a plurality of lanes for single file delivery of bottles, alternate ones of said dividers being fixed and the dividers between alternate ones comprising a stationary shoe portion having a pocket for a movable blade member adapted for reciprocating back and forth movement in the direction of the lanes between extended and retracted limit positions to unjam bottles and insure single file movement through the lanes, said stationary shoe and movable blade member being of predetermined configuration and arrangement providing a continuous barrier during actuation between extended and retracted limit positions preventing bottles from crossing between adjacent lanes.

2. The apparatus of claim 1 which further includes selection means for selectively allowing the passage of said bottles in selected lanes.

3. In apparatus as claimed in claim 1 wherein the fixed divider is disposed rearwardly of the movable blade member and wherein said stationary shoe portion mounting the movable blade member includes a vertically extending arm secured to a reciprocating transversely extending beam and wherein the fixed divider includes a vertically extending arm secured to a transverse bar.

4. In apparatus as claimed in claim 3 including a low friction synthetic member secured to the fixed divider.

5. In apparatus as claimed in claim 3 including means for actuating the beam to thereby move said movable blade member between extended and retracted limit positions.

6. In apparatus as claimed in claim 5 wherein said actuating means includes a cam and cam follower connected to said beam whereby rotation of said cam effects reciprocating motion of said movable blade member between extended and retracted limit positions.

7. In apparatus as claimed in claim 1 wherein the fixed divider has a forwardly extending finger-like projection engagable in an elongated slot in the movable blade member, said projection at least partially engaged in said slot when the movable blade member is in an extended limit position thereby providing the continuous barrier preventing bottles from cross-over between adjacent lanes.

8. In apparatus for washing bottles having a washer housing and conveyor means for delivering bottles in random array from an inlet end through the washer housing, a plurality of dividers at the inlet end spaced apart relative to one another to define a plurality of lanes for single file delivery of bottles, at least some of said dividers comprise a stationary shoe portion having a pocket for a movable blade member adapted for reciprocating back and forth movement in the direction of the lanes between extended and retracted limit positions to unjam bottles and insure single file movement through the lanes, said stationary shoe and movable blade being of predetermined configuration and arrangement providing a continuous barrier during actuation between extended and retracted limit positions preventing bottles from crossing between adjacent lanes.

* * * * *